(12) United States Patent
Cai et al.

(10) Patent No.: US 10,185,725 B1
(45) Date of Patent: Jan. 22, 2019

(54) IMAGE ANNOTATION BASED ON LABEL CONSENSUS

(71) Applicant: Google LLC, Mountain View, CA (US)

(72) Inventors: David Cai, Palo Alto, CA (US); Zhen Hao Zhou, Union City, CA (US); Neil G. Alldrin, San Jose, CA (US); Thomas J. Duerig, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/993,833

(22) Filed: May 31, 2018

Related U.S. Application Data (63) Continuation of application No. 14/741,833, filed on Jun. 17, 2015, now Pat. No. 10,013,436.

(60) Provisional application No. 62/013,105, filed on Jun. 17, 2014.

(51) Int. Cl.
*G06F 17/30* (2006.01)

(52) U.S. Cl.
CPC .. *G06F 17/30268* (2013.01); *G06F 17/30705* (2013.01); *G06F 17/30864* (2013.01)

(58) Field of Classification Search
CPC ......... G06F 17/30268; G06F 17/30705; G06F 17/30864
See application file for complete search history.

(56) References Cited

U.S. PATENT DOCUMENTS

| | | | |
|---|---|---|---|
| 6,728,752 B1 | 4/2004 | Chen et al. | |
| 6,744,935 B2 | 6/2004 | Choi et al. | |
| 6,748,398 B2 | 6/2004 | Zhang et al. | |
| 6,834,288 B2 | 12/2004 | Chen et al. | |
| 6,901,411 B2 | 5/2005 | Li et al. | |
| 6,941,321 B2 | 9/2005 | Schuetze et al. | |
| 7,043,474 B2 | 5/2006 | Mojsilovic et al. | |
| 7,430,566 B2 | 9/2008 | Li et al. | |

(Continued)

FOREIGN PATENT DOCUMENTS

WO    WO2009039480    3/2009

OTHER PUBLICATIONS

Abebe Rorissa, "User-generated descriptions of individual images versus labels of groups of images: A comparison using basic level theory", Jan. 3, 2008, pp. 1741-1753.

(Continued)

*Primary Examiner* — Jared M Bibbee
(74) *Attorney, Agent, or Firm* — Fish & Richardson P.C.

(57) ABSTRACT

Implementations include actions of receiving an initial data set including a plurality of images, each image being associated with a set of labels, wherein each label in the set of labels is assigned to a respective image of the plurality of images by an initial model, the initial model being specific to a ground-truth label; for each image in the plurality of images: providing a list of categories associated with a respective image based on a respective set of labels, and determining a primary category of the respective image based on the list of categories; determining a category of the ground-truth label; and providing a revised data set based on the initial data set by comparing the category to primary categories of respective images in the plurality of images, the initial model being trained based on the revised data set to provide a revised model.

18 Claims, 6 Drawing Sheets

(56) References Cited

U.S. PATENT DOCUMENTS

| | | | |
|---|---|---|---|
| 7,460,735 B1 | 12/2008 | Rowley et al. | |
| 7,478,091 B2 | 1/2009 | Mojsilovic et al. | |
| 7,519,236 B2 | 4/2009 | Cheng et al. | |
| 7,627,556 B2 | 12/2009 | Liu et al. | |
| 7,707,132 B2 | 4/2010 | Xie et al. | |
| 7,907,755 B1 | 3/2011 | Perlmutter et al. | |
| 7,962,500 B2 | 6/2011 | van Zwol et al. | |
| 8,171,043 B2 | 5/2012 | Murdock et al. | |
| 8,391,618 B1* | 3/2013 | Chuang | G06F 17/30247 382/224 |
| 8,429,173 B1 | 4/2013 | Rosenberg et al. | |
| 8,462,991 B1* | 6/2013 | Clements | G06F 17/3087 382/112 |
| 8,819,024 B1* | 8/2014 | Toderici | G06F 17/30731 707/740 |
| 9,053,115 B1 | 6/2015 | Rosenberg et al. | |
| 9,256,807 B1* | 2/2016 | Shlens | G06K 9/6215 |
| 2002/0143769 A1 | 10/2002 | Tecu et al. | |
| 2002/0188602 A1 | 12/2002 | Stubler et al. | |
| 2003/0074369 A1 | 4/2003 | Schuetze et al. | |
| 2003/0187844 A1 | 10/2003 | Li et al. | |
| 2004/0049734 A1 | 3/2004 | Simske | |
| 2004/0064455 A1* | 4/2004 | Rosenzweig | G06T 11/60 |
| 2004/0267693 A1 | 12/2004 | Lowe et al. | |
| 2005/0276477 A1* | 12/2005 | Lin | G06T 11/60 382/173 |
| 2007/0019864 A1 | 1/2007 | Koyama et al. | |
| 2007/0143272 A1 | 6/2007 | Kobayashi | |
| 2007/0214114 A1 | 9/2007 | Liu et al. | |
| 2008/0046424 A1 | 2/2008 | Horton | |
| 2008/0126345 A1 | 5/2008 | Podilchuk | |
| 2008/0133585 A1 | 6/2008 | Vogel et al. | |
| 2009/0063455 A1 | 3/2009 | Li et al. | |
| 2009/0179794 A1 | 7/2009 | Dooley et al. | |
| 2009/0204637 A1* | 8/2009 | Li | G06F 17/3025 |
| 2009/0208097 A1 | 8/2009 | Husseini et al. | |
| 2009/0254539 A1 | 10/2009 | Wen et al. | |
| 2009/0290813 A1 | 11/2009 | He | |
| 2009/0297050 A1 | 12/2009 | Li et al. | |
| 2009/0304272 A1* | 12/2009 | Makadia | G06F 17/30265 382/165 |
| 2009/0313294 A1* | 12/2009 | Mei | G06F 17/30265 |
| 2010/0064254 A1 | 3/2010 | Atsmon et al. | |
| 2010/0074528 A1 | 3/2010 | Hu et al. | |
| 2010/0088295 A1 | 4/2010 | Duan et al. | |
| 2010/0158412 A1 | 6/2010 | Wang et al. | |
| 2010/0166321 A1 | 7/2010 | Sawant et al. | |
| 2010/0226582 A1* | 9/2010 | Luo | G06F 17/30265 382/224 |
| 2011/0085739 A1 | 4/2011 | Zhang et al. | |
| 2011/0293187 A1* | 12/2011 | Sarkar | G06K 9/6211 382/190 |
| 2012/0269436 A1* | 10/2012 | Mensink | G06K 9/00624 382/180 |
| 2013/0138636 A1* | 5/2013 | Jin | G06F 17/30244 707/723 |
| 2014/0351286 A1* | 11/2014 | Matsuda | G06F 17/30268 707/771 |
| 2015/0227531 A1* | 8/2015 | Kulesza | G06F 3/04817 715/739 |
| 2015/0294191 A1* | 10/2015 | Zhang | G06N 99/005 382/160 |

OTHER PUBLICATIONS

Charles Rosenberg et al., abandoned U.S. Patent Application entitled "Query Image Search," U.S. Appl. No. 12/763,489, filed Apr. 20, 2010, including Specification: pp. 1-55; Drawings: Figures 1A-9 on 10 sheets.
Chong Wang et al, "Simultaneous Image Classification and Annotation", Jun. 2009, IEEE, pp. 1903-1910.
Chum O. et al., "Total Recall: Automatic Query Expansion with a Generative Feature Model for Object Retrieval," [online] *ICCV07*(1-8) [retrieved on Apr. 22, 2010], UTC from IEEE Xpore, 8 pages.
Cui J., et al., "Real Time Google and Live Image Search Re-ranking," ACM International Conference on Multimedia 2008, pp. 729-732.
Datta R. et al., "Image Retrieval: Ideas, Influences and Trends of the New Age," ACM *Computing Surveys*, vol. 40, No. 2, article 5, 2008, 60 pages.
Frome A., "Image Retrieval and Classification Using Local Distance Functions," Proceedings of Neural Information Processing Systems (*NIPS*), 2006, pp. 417-424.
Jegou H. et al., "A contextual dissimilarity measure for accurate and efficient image search," [online] *CVPRO7*(1-8) [retrieved on Apr. 22, 2010], UTC from IEEE Xplore, 8 pages.
Ruthven I., et al., "A survey on the use of relevance feedback for information access systems," [online] [retrieved on Apr. 22, 2010], http:www.dcs.qmul.ac.uk/~mounia/CV/Papers/ker_ruthven_lalmas. pdf, 53 pages.
Scott Krig, "Ground Truth Data, Content, Metrics, and Analysis", Chapter 7, Computer Vision Metrics, pp. 283-311 (Year: 2014).
Srivastava et al., "Using objective ground-truth labels created by multiple annotators for improved video classification: A comparative study", Computer Vision and Image Understanding, pp. 1384-1399 (Year: 2013).
Veltkamp and Tanase, "Content-Based Image Retrieval Systems: A Survey," Technical Report UU-CS-2000-34, 2000, 62 pages.
Wang et al. "ARISTA—Image Search to Annotation of Billions of Web Photos," in Proc. IEEE Conf. Computer Vision Pattern Recognition, 2010, pp. 2987-2994.

* cited by examiner

FIG. 1

| | |
|---|---|
|  | crocodile, turtle, sheep, tortoise, zoo  *218* |
|  | tortoise, crocodile, tree frog, clipart, parrot  *220* |
|  | sea turtle, coral, sponge, underwater, coral reef  *222* |
|  | turtle, sea turtle, tortoise, beetle, incense  *224* |
|  | tortoise, eyewear, glasses, brown, sunglasses  *226* |
|  | fur, wreath, yarn, carnival, hat  *228* |
|  | sunglasses, glasses, tortoise, eyewear, gray  *230* |
|  | clamp, sapphire, earring, mirror, bracelet  *232* |

| | | | |
|---|---|---|---|
| 202 |  | crocodile, turtle, sheep, tortoise, zoo _218_ | Animal — 500 |
| 204 |  | tortoise, crocodile, tree frog, clipart, parrot _220_ | Animal — 502 |
| 206 |  | sea turtle, coral, sponge, underwater, coral reef _222_ | Animal — 504 |
| 208 |  | turtle, sea turtle, tortoise, beetle, incense _224_ | Animal — 506 |
| 210 |  | tortoise, eyewear, glasses, brown, sunglasses _226_ | Product — 508 |
| 212 |  | fur, wreath, yarn, carnival, hat _228_ | Product — 510 |
| 214 |  | sunglasses, glasses, tortoise, eyewear, gray _230_ | Product — 512 |
| 216 |  | clamp, sapphire, earring, mirror, bracelet _232_ | Product — 514 |

IMAGE ANNOTATION BASED ON LABEL CONSENSUS

CROSS-REFERENCE TO RELATED APPLICATIONS

This application is a continuation application of U.S. patent application Ser. No. 14/741,833, filed Jun. 17, 2015, which application claims priority to U.S. Prov. App. No. 62/013,105, filed on Jun. 17, 2014, the disclosure of each are expressly incorporated herein by reference in the entirety.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to acquire information of interest. In some examples, users search for images based on search terms, where images can be labeled to enable identification of one or more images that may be relevant to the search terms.

SUMMARY

This specification relates to image models that can be used to label one or more images.

Implementations of the present disclosure are generally directed to providing models for labeling images with one or more labels. More particularly, implementations of the present disclosure are directed to revising data sets based on label consensus, the data sets being used to train respective models.

In general, innovative aspects of the subject matter described in this specification can be embodied in methods that include actions of receiving an initial data set including a plurality of images, each image being associated with a set of labels, wherein each label in the set of labels is assigned to a respective image of the plurality of images by an initial model, the initial model being specific to a ground-truth label, for each image in the plurality of images: providing a list of categories associated with a respective image based on a respective set of labels, and determining a primary category of the respective image based on the list of categories, determining a category of the ground-truth label, and providing a revised data set based on the initial data set by comparing the category to primary categories of respective images in the plurality of images, the initial model being trained based on the revised data set to provide a revised model. Other implementations of this aspect include corresponding systems, apparatus, and computer programs, configured to perform the actions of the methods, encoded on computer storage devices.

These and other implementations can each optionally include one or more of the following features: the revised data set includes one or more images of the initial data set, each image of the one or more images including a respective primary category that is the same as the category; providing a list of categories associated with a respective image based on a respective set of labels includes associating each label in the set of labels with a respective category based on a category map, the category map mapping entities to respective categories; determining a primary category of the respective image based on the list of categories includes selecting a category having a highest category score in the list of categories as the primary category; providing a revised data set based on the initial data set by comparing the category to primary categories of respective images in the plurality of images includes removing an image from the initial data set if the primary category of the image does not match the category; providing a list of categories associated with a respective image based on a respective set of labels includes: obtaining an expanded data set based on the initial data set, providing, for each unique label in a set of unique labels, a label-specific histogram to provide a plurality of histograms, providing, for each histogram of the plurality of histograms, a table to provide a plurality of tables, each table including one or more labels having respective label scores, providing an aggregate table based on the plurality of tables, the aggregate table including an aggregate list of labels, and assigning a category to each label in the aggregate list of labels to provide the list of categories; the expanded data set is provided based on processing training images associated with respective labels in the initial data set to provide an expanded set of labels, the set of unique labels being determined from the expanded set of labels; and the revised model is used to label one or more received images.

Particular implementations of the subject matter described in this specification can be implemented so as to realize one or more of the following advantages. In some examples, human effort to improve label models is reduced. More particularly, data sets used to train models can be automatically processed, with little or no user input, as described here to provide revised data sets that are less noisy than an original data set. In some examples, label models can be provided in parallel across a number of categories, where each category is processed independently. In some examples, the revised data set is robust to data noise, because a label consensus is provided as a statistical metric of all images in the same category. In this manner, more accurate, automatic labeling of images is provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to providing models for labeling images with one or more labels. More particularly, implementations of the present disclosure are directed to revising data sets based on label consensus, the data sets being used to train respective models. In some implementations, and as described herein, an initial data set includes a plurality of images, each image being associated with a set of labels. In some examples, the initial model is specific to a ground-truth label. In some implementations, the plurality of images is processed to assign a primary category to each image, and a revised data set is provided based on the initial data set by comparing the category of the ground-truth label to primary categories of respective images. In some examples, images having primary categories that do not match the category of the ground-truth label are removed from the initial data set to provide the revised data set. In some examples, an initial model that had been previously trained based on the initial data set is trained based on the revised data set to provide a revised model. In some implementations, the revised model is used to provide labels for an image.

Figure 1:
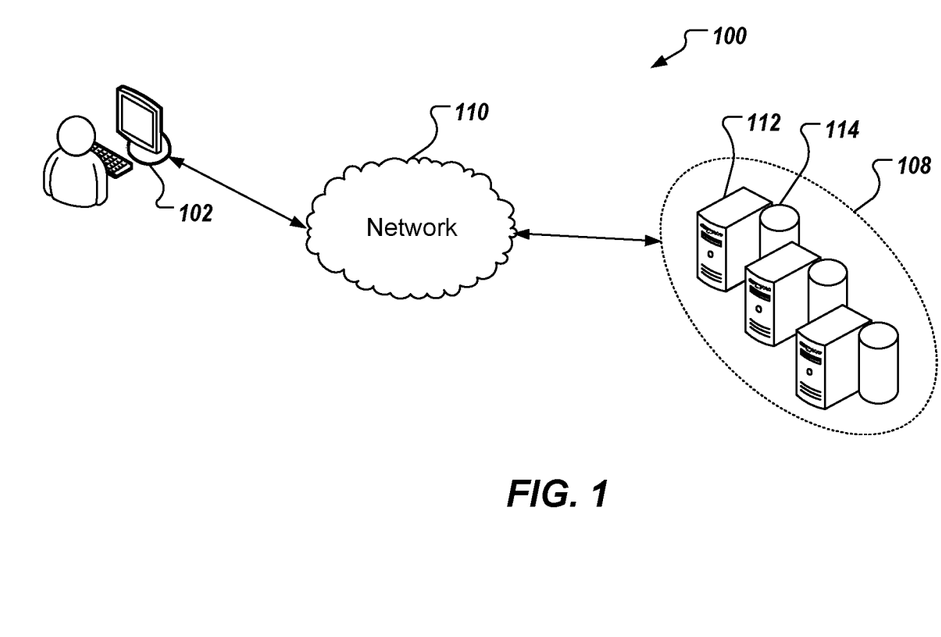
FIG. 1 depicts an example system that can execute implementations of the present disclosure.

FIG. 1 depicts an example system 100 that can execute implementations of the present disclosure. In the depicted example, the system 100 includes a computing device 102 that communicates with a server system 108 over a network 110. In some examples, the computing device 102 can represent various forms of processing devices including, but not limited to, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In some examples, the computing device 102 can interact with application software provided in the server system 108.

In some implementations, the server system 108 can include one or more servers 112 and databases 114. In some examples, the servers 112 can represent various forms of servers including, but not limited to a web server, an application server, a proxy server, a network server, or a server farm. For example, the servers 112 can be application servers that execute software accessed by computing devices 102, 104. In operation, multiple computing devices 102, 104 (e.g., clients) can communicate with the servers 112 by way of the network 110. In some implementations, a user can invoke applications available on the servers 112 in a user-interface application (e.g., a web browser) running on the computing device 102. Each application can individually access data from one or more repository resources (e.g., databases 114).

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing device 102) can communicate with the server system 108 through a virtual private network (VPN), Secure Shell (SSH) tunnel, or other secure network connection. In some implementations, the network 110 can include the Internet, a wireless service network, and may include the Public Switched Telephone Network (PSTN). In other implementations, the network 110 may include a corporate network (e.g., an intranet) and one or more wireless access points.

Implementations of the present disclosure are generally directed to providing models for tagging images with one or more labels. More particularly, implementations of the present disclosure are directed to revising data sets based on label consensus, the data sets being used to train respective models. In some implementations, an initial data set is provided and includes a plurality of images. In some examples, each image is associated with a set of labels, and each label in the set of labels is assigned to a respective image of the plurality of images by an initial model. In some examples, the initial model is specific to a ground-truth label. In some implementations, the plurality of images is processed to assign a primary category to each image. In some examples, for each image in the plurality of images, a list of categories associated with a respective image is provided based on a respective set of labels, and a primary category of the respective image is determined based on the list of categories. In some examples, a category of the ground-truth label is provided. In some implementations, a revised data set is provided based on the initial data set by comparing the category to primary categories of respective images in the plurality of images. In some examples, images having primary categories that do not match the category of the ground-truth label are removed from the initial data set to provide the revised data set. In some examples, the initial model is trained based on the revised data set to provide a revised model.

In some implementations, the image model can be provided as a multi-layer convolutional network. In some examples, each layer includes one or more parameters that can be represented as respective nodes. In some examples, a node can be connected to one or more other nodes in adjacent layers. In some examples, an untrained model is provided, in which all parameters in all layers are randomly assigned. In some examples, the untrained model is trained based on a training data set to provide the initial model. In some examples, training of the untrained model includes changing the parameters based on the training data set. In some examples, the initial model is retrained based on the revised data set to provide a revised model. In some examples, retraining of the initial model includes changing the parameters based on the revised data set. Although a multi-layer convolution network is described herein as an example image model, it is contemplated that any appropriate type of image model can be used in implementations of the present disclosure.

Figure 2:
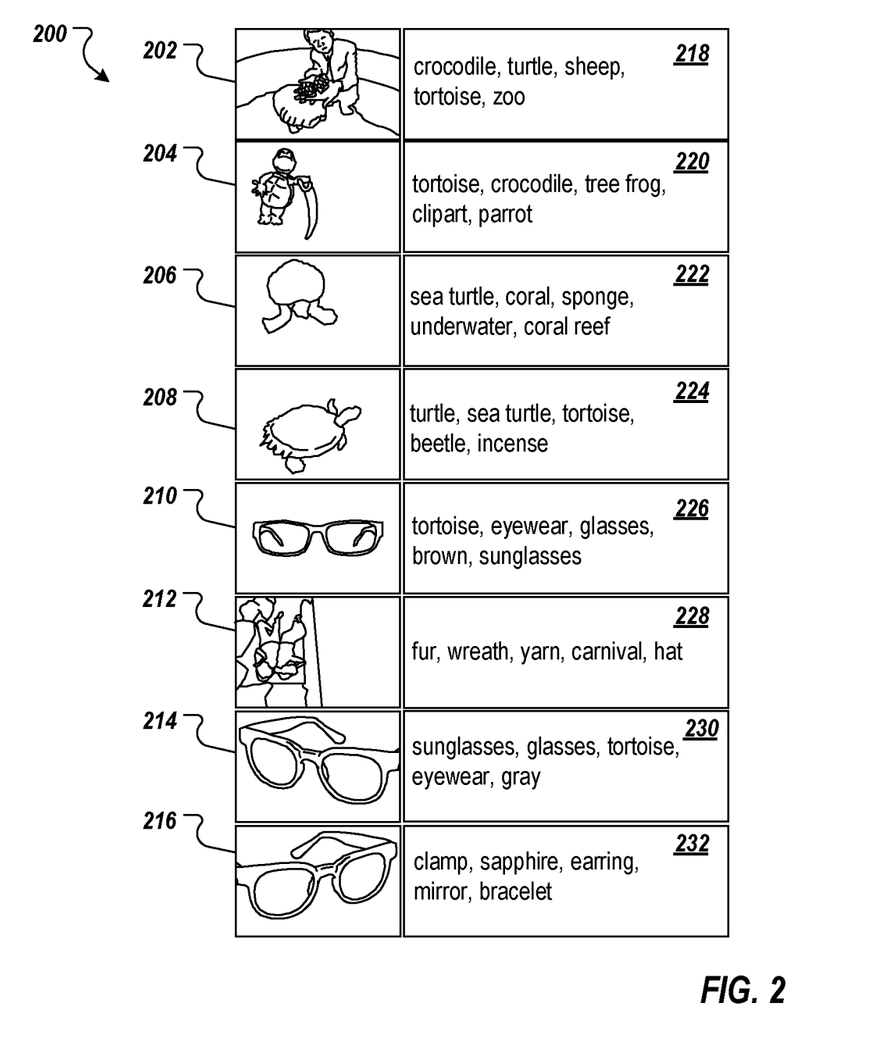
FIG. 2 depicts an example data set.

Implementations of the present disclosure will be described in further detail herein with reference to an example data set. It is contemplated, however, that implementations of the present disclosure are applicable to any appropriate data set. FIG. 2 depicts an example data set 200 in accordance with implementations of the present disclosure. The example data set 200 includes a plurality of images 202, 204, 206, 208, 210, 212, 214, 216 each image being associated with a respective set of labels 218, 220, 222, 224, 226, 228, 230, 232. The example data set 200 can be described as a noisy data set, in that the example data set 200 includes images that are improperly labeled. For example, the set of labels 224 of the image 208 includes "beetle" and "incense," which labels are unrelated to the content of the image 208.

In some implementations, a label that is to be modeled is selected. For example, a "turtle" model can be provided for the ground-truth label "turtle." In some examples, a noisy data set that includes a set of images ($X=(x_1, \ldots, x_n)$) is provided for the subject label. In some examples, each image is associated with a respective set of k labels from a set of ground-truth labels ($L=(l_1, \ldots, l_m)$). For example, the example data set 200 of FIG. 2 can be provided for the ground-truth label "turtle." In some examples, an initial model is trained for the respective label using the noisy data set. Because the initial model for the respective label is trained using the noisy data set, it is expected that the initial model is imperfect. For example, the initial model can be used to assign labels to images. However, a certain percentage of labels will incorrectly reflect the content of respective images.

In some implementations, the data set is provided as input to the initial model to provide the top k predicted labels (e.g., k=5) for each of the images $x_1, \ldots, x_n$. FIG. 2 depicts example labeling results for the example data set. In the example of FIG. 2, the data set includes eight images, e.g., $X=(x_1, \ldots, x_8)$, and processing the data set results in k labels per image, e.g., k=5, to provide a total of forty (40) labels. The example data set can be provided as:

$x_1 \rightarrow l_{1,1}, \ldots, l_{1,5}; x_2 \rightarrow l_{2,1}, \ldots, l_{2,5}; \ldots; x_8 \rightarrow l_{8,1}, \ldots, l_{8,5}$ In the depicted example, of the forty (40) labels, there are thirty (30) unique labels, e.g., the label "turtle" appears twice, the label "tortoise" appears five times. Consequently, a set of q unique labels is provided, e.g., q=30.

In some implementations, each label is associated with a set of training images, which can be used to train models for the particular label. In some examples, each label is associated with a set of p training images, e.g., p=1000. For example, the set of training images can be denoted as $Y=(y_1, \ldots, y_p)$. In some examples, labels can be associated with different numbers of training images. For example, a first label can be associated with a set of p training images, and a second label can be associated with a set of s training images, where s is not equal top. In the present example, it is provided that each label is associated with a set of p training images.

In some implementations, for each label in the set of q unique labels, the training images in the respective set of p training images are processed using the initial model, which selects k labels for each training image. Consequently, the number of labels provided is equal to the product of p and k, e.g., p·k. In the example where p=1000 and k=5, 5000 labels are provided, e.g., p·k=5000. That is, 5 labels are provided for each image in the set of p training images for each label in the set of q unique labels.

In some implementations, the labels are aggregated into a histogram (H), where each bin of the histogram is associated with a unique label of the (p·k) labels and indicates the number of times that the respective label occurs in the (p·k) labels. For example, a bin is provided for a label and is incremented for each time the label occurs in the (p·k) labels. In some examples, the histogram is normalized based on the number of labels. In this manner, each bin reflects a percentage of times that the respective label occurs in the (p·k) labels.

Figure 3:
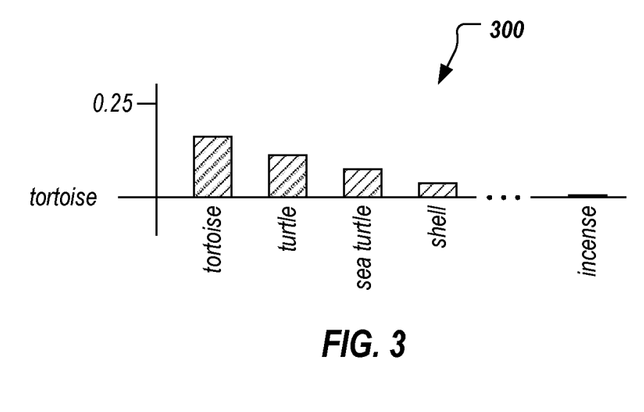
FIGS. 3 and 4 depict example histograms of respective labels.
Figure 4:
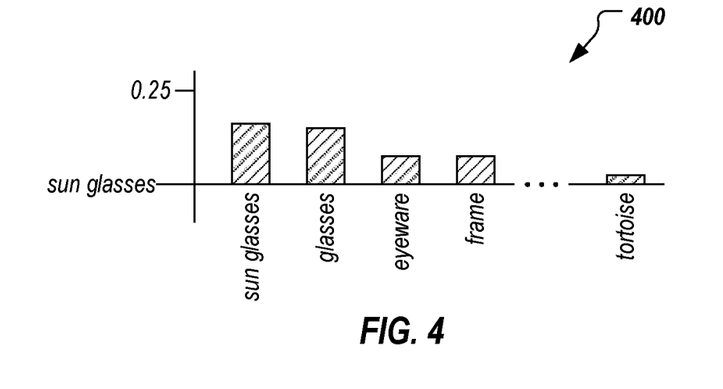

FIGS. 3 and 4 depict example histograms of respective labels. FIG. 3 depicts an example histogram 300 for the label "tortoise." In the example of FIG. 3, labels of the (p·k) labels for the label "tortoise" include "tortoise," "turtle," "sea turtle," "shell," and "incense," among other labels not specifically identified. In the example of FIG. 3, the label "tortoise" is the most common label. This is expected, because the respective set of p training images for the label "tortoise" was used to provide the histogram of FIG. 3.

FIG. 4 depicts an example histogram 400 for the label "sun glasses." In the example of FIG. 4, labels of the (p·k) labels for the label "sun glasses" include "sun glasses," "glasses," "eyewear," "frame," and "tortoise," among other labels not specifically identified. In the example of FIG. 4, the label "sun glasses" is the most common label. This is expected, because the respective set of p training images for the label "sun glasses" would have been used to provide the histogram of FIG. 4.

With continued reference to the example of FIG. 2, each of respective sets of p training images are processed for each label to provide thirty (30) histograms, e.g., a histogram for each unique label in the set of q unique labels based on the example of FIG. 2. Each histogram is converted to a respective table that maps the respective label to a list of labels (l) and respective scores (a), e.g., $T_r \rightarrow (l_i, \alpha_i)$. Consequently, a table is provided for each unique label of the set of q unique labels, e.g., r=1, \ldots, q. For example, the label "tortoise" is mapped to a list of labels that includes "tortoise," "turtle," "sea turtle," "shell," and "incense," among other labels not specifically identified, as well as respective scores (a) for each label in the list of labels. As another example, the label "sun glasses" is mapped to a list of labels that includes "sun glasses," "glasses," "eyewear," "frame," and "tortoise," among other labels not specifically identified, as well as respective scores a for each label in the list of labels. In some examples, each score $\alpha$ is provided as the percentage of times that the respective label occurs in the (p·k) labels for the subject label. In this manner, each score $\alpha$ reflects a relative strength of a respective label with respect to other labels in the (p·k) labels for the subject label In some implementations, an aggregate table is provided based on the tables. In some implementations, the tables for each of the labels of the subject image are aggregated to provide the aggregate table for the subject image. More particularly, the aggregate table is provided as an aggregation of labels and respective scores across the tables for labels of a respective image (x) of the initial data set, e.g., the example data set 200 of FIG. 2. For example, the image 202 includes the labels "crocodile," "turtle," "sheep," "tortoise," and "zoo" in the set of labels 218, each of which is associated with a respective table that is provided based on a respective set of p training images for the respective label. For example, the label "crocodile" can be associated with a table that includes the labels "crocodile," "alligator," "reptile," "water," and "boots," and respective scores (a). As another example, the label "tortoise" is associated with a table that includes the labels "tortoise," "turtle," "sea turtle," "shell," and "incense," and respective scores (a), as described above with reference to FIG. 3.

In some examples, each unique label across the tables is included in the aggregate table, and the scores (a) are aggregated in the aggregate table in cases where a unique label is provided multiple times, e.g., is redundant, in the tables. For example, the labels "crocodile," "alligator," "reptile," "water," and "boots," and respective scores (a) are added to the aggregate table based on the first table associated with the label "crocodile." This is repeated for each label of the set of labels associated with the subject image, e.g., each label in the set of labels 218 for the image 202 of FIG. 2. In the case of a redundant label, the redundant label is not again added. Instead, the scores ($\alpha$) are combined. In this manner, the aggregate table provides a list of all unique labels across the tables of the respective labels associated with the subject image, and respective scores ($\beta$). In the case of non-redundant labels, the score ($\beta$) is equal to the score ($\alpha$). In the case of redundant labels, the score ($\beta$) is equal to the sum of the scores ($\alpha$) for the redundant label across the tables.

In some implementations, each unique label in the aggregate table is mapped to a category based on a category map. Consequently, for each unique label in the aggregate table, a category can be associated therewith. In some examples, the category map maps each label of a plurality of labels to category. In some examples, a limited number of categories are provided, and every label is mapped to one of the categories. Example categories include "animal," "entertainment," "business," and "product." In some examples, each category has a plurality of sub-categories associated therewith. For example, the category "animal" can have the sub-category "reptile," which can have the sub-categories "tortoise," "alligator," and "crocodile," among others. Consequently, the labels "turtle," "tortoise," "crocodile," and "alligator," among others, are mapped to the category "animal."

In some implementations, categories of the aggregate table are aggregated. More specifically, a list of unique categories included in the aggregate table is provided with respective category scores (A). In some examples, each unique category in the aggregate table is included in the list of categories, and the scores (β) are aggregated in the list of categories in cases where a category is provided multiple times, e.g., is redundant, in the second table. For example, the labels "turtle," "tortoise," "crocodile," and "alligator," among others, are mapped to the category "animal." Consequently, the category "animal" is included in the list of categories, and respective scores (β) of the labels are summed to provide a category score (λ).

Figure 5:
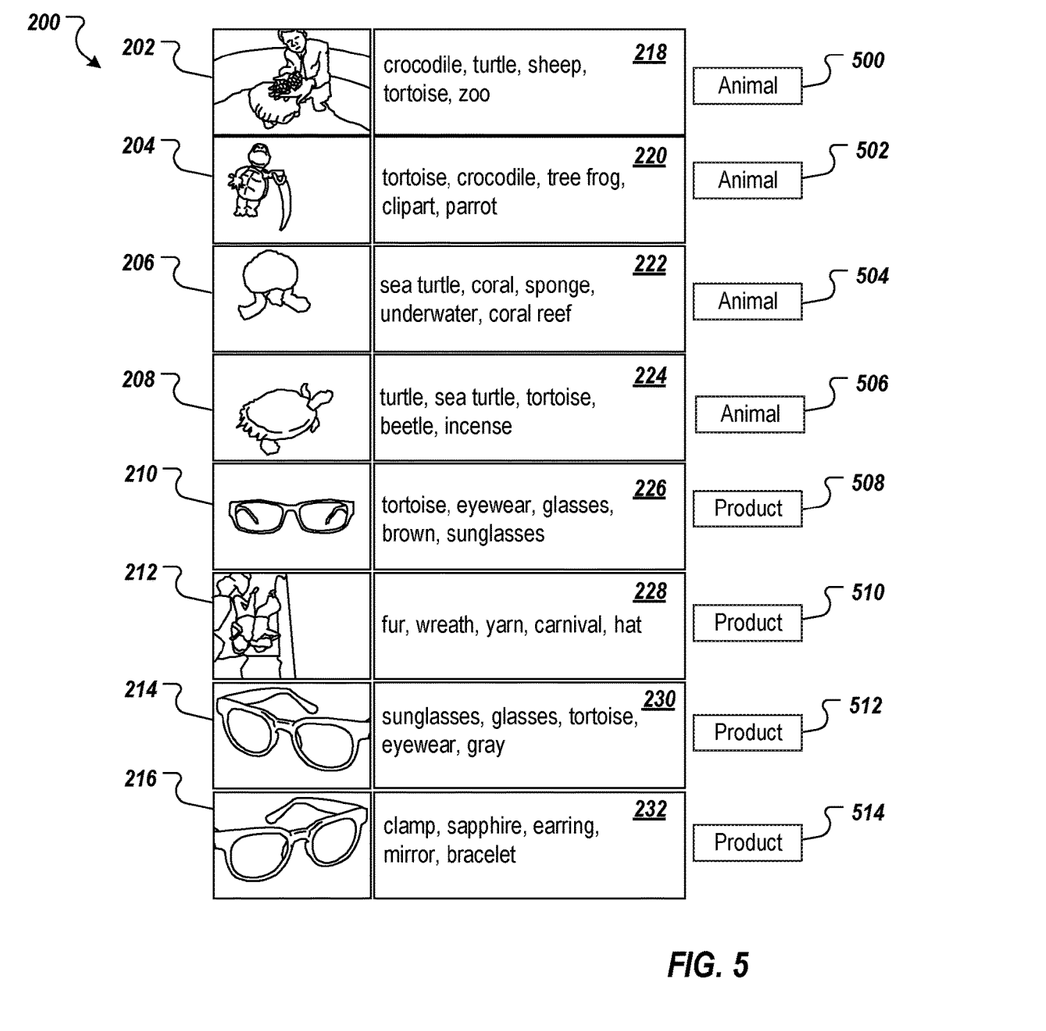
FIG. 5 depicts the example data set of FIG. 2 with primary categories associated with the respective images.

In some implementations, a primary category is determined for the subject image based on the respective category scores. In some examples, the category having the highest category score is selected as the primary category for the image. FIG. 5 depicts the example data set 200 of FIG. 2, with primary categories 500, 502, 504, 506, 508, 510, 512, 514 associated with the respective images 202, 204, 206, 208, 210, 212, 214, 216.

In accordance with implementations of the present disclosure, the category associated with the ground-truth label, e.g., the label, for which the model is being provided, is compared to the primary category of each image in the data set that was used to initially train the model. In some examples, a revised data set is provided based on the comparison. For example, if the primary category of the image is not the same as the category of the ground-truth label, the image is removed from the data set. As another example, if the primary category of the image is the same as the category of the ground-truth label, the image remains in the data set. In the example of FIG. 5, and for the ground-truth label "turtle," which maps to the category "animal," the images 210, 212, 214, 216 and respective sets of labels, 226, 228, 230, 232 are removed from the data set.

In some implementations, the initial model is re-trained for the respective ground-truth label using the revised data set to provide a revised model.

In some implementations, replacement data can be added to the revised data set to substitute for removed data. In some examples, the above-described process can be recursively repeated until all of the primary categories provided for the data set match the category of the ground-truth label.

Figure 6:
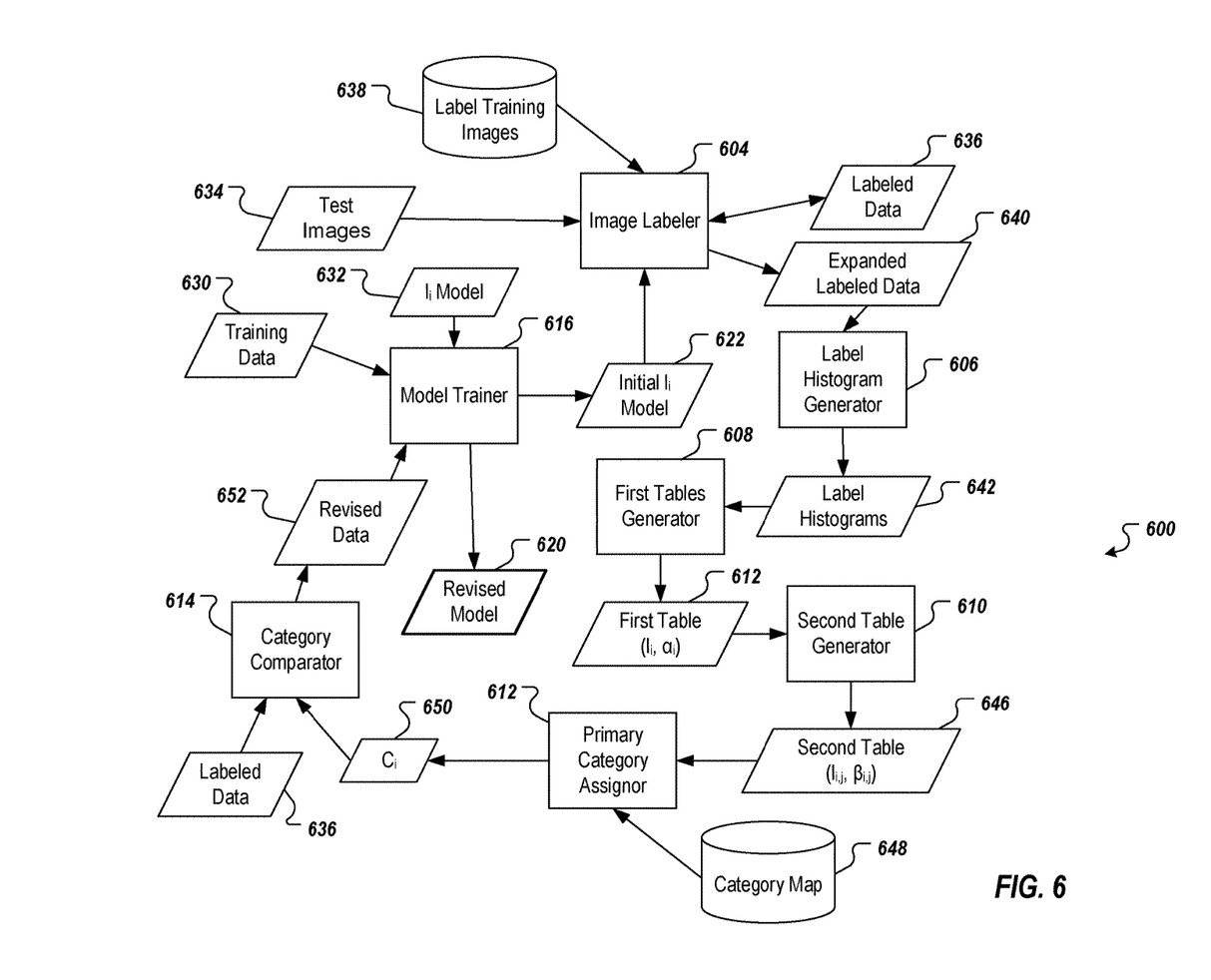
FIG. 6 depicts an example data flow in accordance with implementations of the present disclosure.

FIG. 6 depicts an example data flow 600 in accordance with implementations of the present disclosure. In the example of FIG. 6, example components include a model trainer 602, an image labeler 604, a label histogram generator 606, a first table generator 608, a second table generator 610, a primary category assignor 612, and a category comparer 614. In some examples, and as described in further detail herein, data is communicated between the example data component to provide a revised model 620 from an initial model 622. In some examples, each of the components is provided as a computer-executable program that is executed by one or more processors.

In some implementations, the model trainer 602 receives training data 630 and an untrained data model 632. In some examples, the training data 630 and the untrained model 632 are specific to a particular ground-truth label, e.g., "turtle." In some examples, the model trainer 602 processes the untrained model 632 and the training data 630 to provide the initial model 622. In some examples, the training data 630 is provided as a noisy data set. Consequently, the initial model 622 is deemed to be imperfect, such that the initial model is expected to improperly assign a certain percentage of labels to images.

In some implementations, the image labeler 604 receives the initial model 622 and a plurality of images 634. In some examples, the plurality of test images includes one or more images that were included in the training data 630. In some implementations, the image labeler 604 processes the plurality of test images 634 in view of the initial model 604 to provide a labeled data set 636, e.g., such as the example data set 200 of FIG. 2. That is, for example, the image labeler 604 uses the initial data model 622 to assign k labels to each image of the plurality of test images 634. In some examples, the labeled data set 636 includes a set of q unique labels.

In some implementations, the image labeler 604 receives label training images from a label training images repository 638 based on the labels provided in the labeled data set 636. For example, and as described above, for each label in the set of q unique labels provided in the labeled data set 636, the image labeler 604 receives a set of p training images. In some implementations, for each label in the set of q unique labels, the image labeler 604 processes the training images in the respective set of p training images using the initial model 622, which selects k labels for each training image to provide an expanded labeled data set 640. In accordance with the examples described above, the number of labels provided in the expanded labeled data set 640 is equal to the product of p and k, e.g., p·k. In the example where p=1000 and k=5, 5000 labels are provided in the expanded labeled data set, e.g., p·k=5000.

In some implementations, the expanded labeled data set 640 is processed by the label histogram generator 606 to provide histograms (Π) for respective labels, e.g., of the set of q unique labels provided in the labeled data set 636. In some examples, the labels are aggregated into a histogram (Π), where each bin of the histogram is associated with a unique label of the (p·k) labels and indicates the number of times that the respective label occurs in the (p·k) labels. In some examples, the histogram is normalized based on the number of labels. In this manner, each bin reflects a percentage of times that the label occurs in the (p·k) labels. In some examples, the label histogram generator 606 provides a plurality of label histograms 642, each label histogram being specific to a respective label.

In some implementations, the label histograms 642 are provided to the first table generator 608, which processes the label histograms to provide a first table 644. In some examples, and as described above, each histogram is converted to a respective first table that maps the respective label to a list of labels (l) and respective scores (α), e.g., $T_r \rightarrow (l_i, \alpha_i)$. Consequently, a first table is provided for each unique label of the set of q unique labels, e.g., $r=1, \ldots, q$. In some examples, each score α is provided as the percentage of times that the respective label occurs in the (p·k) labels for the subject label.

In some implementations, the first tables 644 are provided to the second table generator 610, which processes the first tables 644 to provide a second table 646. In some examples, the second table is provided as the aggregate table. More specifically, and as described above, each unique label across the first tables is included in the second table (the aggregate table), and the scores ($\alpha$) are aggregated in the second table in cases where a unique label is provided multiple times, e.g., is redundant, in the first tables. In the case of a redundant label, the redundant label is not again added to the second table. Instead, the scores ($\alpha$) are combined. In this manner, the second table provides a list of all unique labels across the first tables of the respective labels associated with the subject image, and respective scores ($\beta$). In the case of non-redundant labels, the score ($\beta$) is equal to the score ($\alpha$). In the case of redundant labels, the score ($\beta$) is equal to the sum of the scores ($\alpha$) for the redundant label across the first tables.

In some implementations, the second table 646 is provided to the primary category assignor 612. In some examples, the primary category assignor 612 receives category data from a category map repository 648. In some examples, the primary category assignor 612 processes the second table 646 and the category data to assign a category (C) to each label in the second table 636. More particularly, and as described above, each unique label in the second table 646 is mapped to a category (C) based on the category data, e.g., a category map. Consequently, for each unique label in the second table, a category can be associated therewith. In some implementations, the primary category assignor 612 aggregates the categories of the second table. More specifically, and in some examples, a list of unique categories included in the second table 646 is provided with respective category scores ($\lambda$). In some examples, each unique category in the second table 646 is included in the list of categories, and the scores ($\beta$) are aggregated in the list of categories in cases where a category is provided multiple times, e.g., is redundant, in the second table. In some implementations, a primary category is determined for the subject image based on the respective category scores. In some examples, the category having the highest category score is selected as the primary category for the image. In some examples, the primary category assignor 612 provides a list of categories 650, which provides a primary category (C) for each image provided in the labeled data 636.

In some implementations, the category comparator 614 receives the labeled data 636 and the list of categories 650, and provides a revised data set 652 based thereon. More specifically, and as described above, a category associated with the ground-truth label, e.g., the label, for which the initial model 622 is being provided, is compared to the primary category of each image in the list of categories 650. In some examples, the revised data set 652 is provided based on the comparison. For example, if the primary category of the image is not the same as the category of the ground-truth label, the image is removed from the labeled data 636. As another example, if the primary category of the image is the same as the category of the ground-truth label, the image remains in the labeled data 636. In this manner, the revised data set 652 is provided as the labeled data set 636 with images selectively removed therefrom, e.g., images having a primary category that is different from the category.

In some implementations, the model trainer 602 receives the revised data set 652 and provides a revised model based thereon. In some examples, the model trainer 602 retrains the initial model 622 based on the revised data set 652 to provide the revised model 620. In some examples, the model trainer trains the untrained model 632 using the revised data set 652 to provide the revised model 620.

Figure 7:
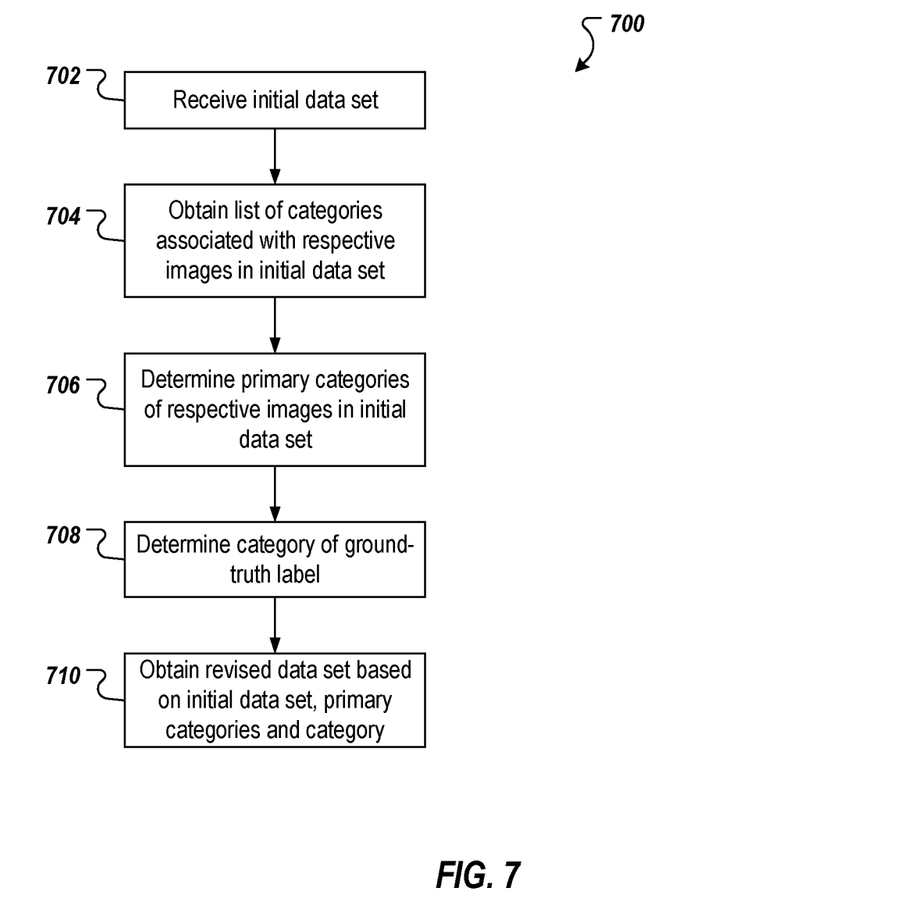
FIG. 7 depicts an example process that can be executed in accordance with implementations of the present disclosure.

FIG. 7 depicts an example process 700 that can be executed in accordance with implementations of the present disclosure. The example process 700 can be implemented, for example, by the example environment 100 of FIG. 1. In some examples, the example process 700 can be provided by one or more computer-executable programs executed using one or more computing devices.

An initial data set is received (702). In some examples, the initial data set includes a plurality of images, each image being associated with a set of labels. In some examples, each label in the set of labels is assigned to a respective image of the plurality of images by an initial model that is specific to a ground-truth label. A list of categories associated with respective images in the initial data set is obtained (704). In some examples, the list of categories is obtained based on a plurality of labeled histograms that are provided from an expanded labeled data set, the expanded labeled data set being provided based on the initial data set and training images for each label provided in the initial data set. In some examples, an aggregate table is provided based on the label histograms, and categories are assigned based on a category map and the aggregate table. Primary categories of respective images in the initial data set are determined (706). In some examples, a primary category of a respective image is determined based on weights assigned to categories in the aggregate table. A category of the ground-truth label is determined (708). In some examples, the category is determined based on the category map. A revised data set is obtained based on the initial data set, the primary categories and the category (710). In some examples, the revised data set is obtained by comparing the category to primary categories of respective images in the plurality of images. In some examples, the initial model is trained based on the revised data set to provide a revised model.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   receiving, by the one or more processors, an initial data set comprising a plurality of images, each image from the plurality of images being associated with a set of labels, wherein each label in the set of labels is assigned to the image of the plurality of images by an initial model, the initial model being trained for a particular ground-truth label;
   for each image in the plurality of images in the initial data set, predicting, using the initial model, a set of top k predicted labels for the initial data set;
   determining, from the sets of top k predicted labels, a set of unique labels;
   for each unique label in the set of unique labels:
      selecting a respective set of training images for the unique label;
      predicting, using the initial model, a set of top k predicted labels for the respective set of training images; and
      generating, for each label of the top k predicted labels, a value based on the number of times the respective label occurs in the top k predicted labels in respective set of training images for the unique label;
      generating, from the values of each of the labels in the top k predicted labels, a mapping of the unique label to labels in the top k predicted labels that indicates relative strengths of the unique label to the labels in the top k predicted labels;
   determining, from the mapping, categories for each unique label; and
   determining, for each image in the initial data set, a primary category of the image based on the list of categories of the set of labels for the image.

2. The computer-implemented method of claim 1, further comprising:
   comparing, by the one or more processors, the category of the ground-truth label to primary categories of respective images in the plurality of images in the initial data set;
   selecting, by the one or more processors, a revised data set, wherein the revised data set includes only images of the initial data set that are associated with a respective primary category that is the same as the category of the ground-truth label; and
   providing, by the one or more processors, the revised data set to retrain the initial model to provide a revised model.

3. The method of claim 1, wherein determining, from the mapping, categories for each unique label comprises associating each label in the top k predicted labels with a respective category based on a category map, the category map mapping entities to respective categories.

4. The method of claim 1, wherein determining a primary category of the image based on the list of categories comprises selecting a category having a highest category score in the list of categories as the primary category.

5. The method of claim 1, wherein the expanded data set is provided based on processing training images associated with respective labels in the initial data set to provide an expanded set of labels, the set of unique labels being determined from the expanded set of labels.

6. The method of claim 1, wherein the revised model is used to label one or more received images.

7. A system comprising:
   a data store for storing data; and
   one or more processors configured to interact with the data store, the one or more processors being further configured to perform operations comprising:
   receiving, by the one or more processors, an initial data set comprising a plurality of images, each image from the plurality of images being associated with a set of labels, wherein each label in the set of labels is assigned to the image of the plurality of images by an initial model, the initial model being trained for a particular ground-truth label;
   for each image in the plurality of images in the initial data set, predicting, using the initial model, a set of top k predicted labels for the initial data set;
   determining, from the sets of top k predicted labels, a set of unique labels;
   for each unique label in the set of unique labels:
      selecting a respective set of training images for the unique label;
      predicting, using the initial model, a set of top k predicted labels for the respective set of training images; and
      generating, for each label of the top k predicted labels, a value based on the number of times the respective label occurs in the top k predicted labels in respective set of training images for the unique label;
      generating, from the values of each of the labels in the top k predicted labels, a mapping of the unique label to labels in the top k predicted labels
   determining, from the mapping, categories for each unique label; and
   determining, for each image in the initial data set, a primary category of the image based on the list of categories of the set of labels for the image.

8. The system of claim 7, the operations further comprising:
   comparing, by the one or more processors, the category of the ground-truth label to primary categories of respective images in the plurality of images in the initial data set;
   selecting, by the one or more processors, a revised data set, wherein the revised data set includes only images of the initial data set that are associated with a respective primary category that is the same as the category of the ground-truth label; and providing, by the one or more processors, the revised data set to retrain the initial model to provide a revised model.

9. The system of claim 7, wherein determining, from the mapping, categories for each unique label comprises associating each label in the top k predicted labels with a respective category based on a category map, the category map mapping entities to respective categories.

10. The system of claim 7, wherein determining a primary category of the image based on the list of categories comprises selecting a category having a highest category score in the list of categories as the primary category.

11. The system of claim 7, wherein the expanded data set is provided based on processing training images associated with respective labels in the initial data set to provide an expanded set of labels, the set of unique labels being determined from the expanded set of labels.

12. The system of claim 7, wherein the revised model is used to label one or more received images.

13. A computer readable medium storing instructions that, when executed by one or more processors, cause the one or more processors to perform operations comprising:
- receiving, by the one or more processors, an initial data set comprising a plurality of images, each image from the plurality of images being associated with a set of labels, wherein each label in the set of labels is assigned to the image of the plurality of images by an initial model, the initial model being trained for a particular ground-truth label;
- for each image in the plurality of images in the initial data set, predicting, using the initial model, a set of top k predicted labels for the initial data set;
- determining, from the sets of top k predicted labels, a set of unique labels;
- for each unique label in the set of unique labels:
  - selecting a respective set of training images for the unique label;
  - predicting, using the initial model, a set of top k predicted labels for the respective set of training images; and
  - generating, for each label of the top k predicted labels, a value based on the number of times the respective label occurs in the top k predicted labels in respective set of training images for the unique label;
  - generating, from the values of each of the labels in the top k predicted labels, a mapping of the unique label to labels in the top k predicted labels
- determining, from the mapping, categories for each unique label; and
- determining, for each image in the initial data set, a primary category of the image based on the list of categories of the set of labels for the image.

14. The computer-readable medium of claim 13, the operations further comprising:
- comparing, by the one or more processors, the category of the ground-truth label to primary categories of respective images in the plurality of images in the initial data set;
- selecting, by the one or more processors, a revised data set, wherein the revised data set includes only images of the initial data set that are associated with a respective primary category that is the same as the category of the ground-truth label; and
- providing, by the one or more processors, the revised data set to retrain the initial model to provide a revised model.

15. The computer-readable medium of claim 13, wherein determining, from the mapping, categories for each unique label comprises associating each label in the top k predicted labels with a respective category based on a category map, the category map mapping entities to respective categories.

16. The computer-readable medium of claim 13, wherein determining a primary category of the image based on the list of categories comprises selecting a category having a highest category score in the list of categories as the primary category.

17. The computer-readable medium of claim 13, wherein the expanded data set is provided based on processing training images associated with respective labels in the initial data set to provide an expanded set of labels, the set of unique labels being determined from the expanded set of labels.

18. The computer-readable medium of claim 13, wherein the revised model is used to label one or more received images.

* * * * *